J. H. FISHER.
Tap-Holder Attachments for Beer-Coolers.
No. 143,068. Patented September 23, 1873.
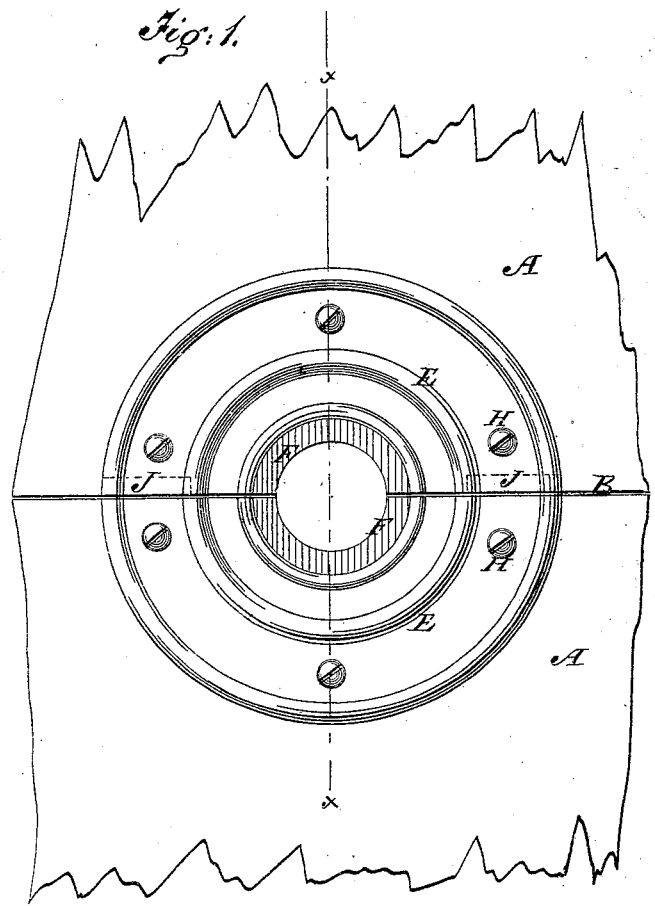
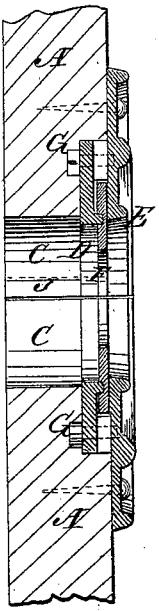

UNITED STATES PATENT OFFICE.

JOSEPH HYDE FISHER, OF CHICAGO, ILLINOIS.

IMPROVEMENT IN TAP-HOLDER ATTACHMENTS FOR BEER-COOLERS.

Specification forming part of Letters Patent No. 143,068, dated September 23, 1873; application filed August 23, 1873.

*To all whom it may concern:*

Be it known that I, JOSEPH HYDE FISHER, of Chicago, in the county of Cook and State of Illinois, have invented a new and Improved Tap-Hole Attachment to Beer-Coolers, of which the following is a specification:

My invention consists of an attachment to beer-coolers for packing the hole through which the faucet projects to prevent the escape of the cold air, which is composed of a couple of circular flat rings screwed together and clamping a ring of rubber packing between them, which has a hole for the faucet a little smaller than said faucet, so as to stretch tightly upon the faucet and make a tight joint, the rings being screwed onto the side of the cooling-box. The two metal rings and the rubber ring are cut in halves diametrically, and are applied at the crack of the door, one part to the latter, and the other to the case, so that the door of the box can be opened to facilitate the putting in and removing of the beer-casks with the faucets in them; and one of the parts of the outer metal ring is provided with ears projecting backward at right angles to the face to screw onto the edge of the box-case at the joint of the door with which the line on which the plates meet coincides.

Figure 1 is a front elevation of my improved tap-hole attachment, and Fig. 2 is a sectional elevation of Fig. 1 on the line $x$ $x$.

Similar letters of reference indicate corresponding parts.

A represents the cooling-box case; B, the joint between the stationary wall and the door; C, the tap or faucet hole, out of which the faucet of the beer-cask projects to draw the beer from the cask within the cooling-box. D is the narrow inner metal clamping-ring; E, the wider outer metal clamping-plate, and F the packing-ring of soft vulcanized rubber. The rubber packing-ring is clamped tightly between the two metal rings, which are screwed together by the screws G. The rings D and F are let into a recess in the side of the box-case to allow the wide ring-plate E to be screwed up tight to the box-side outside of the said rings D and F by the screws H. The three rings D E F are all separated on the line B, and one part is attached to the stationary part of the cooler-box, and the other part to the door, so that when the attachment is applied to the cooler it does not require to be removed when the beer-casks are changed, as ample room for changing the faucets is afforded by opening the door of the cooler. The part attached to the box has flanges J bolted to the edge of the box.

Having thus described my invention, I claim as new and desire to secure by Letters Patent—

A packing for tap-holes of beer-coolers composed of the metal clamping-rings D E and rubber packing-ring F, arranged in two parts, of which one is fastened to the box, and the other to the door, in connection with the tap-hole, substantially as specified.

JOSEPH HYDE FISHER.

Witnesses:
CORNELIUS VAN SCHAACK,
LORIN C. COLLINS, Jr.